United States Patent [19]

Young

[11] 4,442,727

[45] Apr. 17, 1984

[54] CONTROL MEANS FOR ROTARY POWER TRANSMISSION

[75] Inventor: Alastair J. Young, 39 Roundshill, Kenilworth, England

[73] Assignee: Alastair John Young, Leamington Spa, England

[21] Appl. No.: 302,533

[22] Filed: Sep. 16, 1981

[30] Foreign Application Priority Data

Oct. 29, 1980 [GB] United Kingdom ............... 8034839

[51] Int. Cl.³ .................... F16H 5/52; F16H 5/42; B60K 41/16
[52] U.S. Cl. .................... 74/336 R; 74/337; 74/868; 74/869
[58] Field of Search ............ 74/869, 868, 867, 866, 74/336 R, 337

[56] References Cited

U.S. PATENT DOCUMENTS

| 3,691,861 | 9/1972 | Stürmer ........................ 74/337.5 |
| 3,695,121 | 10/1972 | Corrigan et al. ................ 74/753 |
| 3,797,330 | 3/1974 | Ushijima ....................... 74/866 |
| 3,823,621 | 7/1974 | Kubo et al. .................... 74/869 |
| 3,903,759 | 9/1975 | Hashimoto ..................... 74/866 |
| 4,335,428 | 6/1982 | Miki et al. ..................... 74/866 |
| 4,346,627 | 7/1982 | Kawamoto et al. .............. 74/869 |
| 4,361,060 | 11/1982 | Smyth .......................... 74/866 |

FOREIGN PATENT DOCUMENTS

| 1963880 | 6/1971 | Fed. Rep. of Germany . |
| 2212679 | 9/1973 | Fed. Rep. of Germany . |
| 1469727 | 2/1967 | France . |
| 1584485 | 12/1969 | France . |
| 604178 | 6/1948 | United Kingdom . |
| 1225267 | 3/1971 | United Kingdom . |
| 1331649 | 9/1973 | United Kingdom . |
| 1339185 | 11/1973 | United Kingdom . |

Primary Examiner—Allan D. Herrmann
Assistant Examiner—D. Wright
Attorney, Agent, or Firm—Kemon & Estabrook

[57] ABSTRACT

A rotary power transmission having a series of up to five gear trains and two clutches alternately engagable to provide drive paths through the gear trains in series sequence has control means including a fluid pressure source and three solenoid-operated valves to direct source fluid to two spool valves which provide discrete fluid pressure signals for engagement of gear trains two at a time in progressively over-lapping pairs, the gear trains being for eventual drive according to clutch engagement.

6 Claims, 3 Drawing Figures

| SOLENOID ENERGIZED | | | RATIO(S) SELECTED | CLUTCH ENGAGED | RATIO DRIVING |
|---|---|---|---|---|---|
| A | B | C | | | |
| 0 | 0 | 0 | N | — | N |
| 1 | 0 | 0 | 1,2 | C1 | 1 |
| 1 | 1 | 0 | 2,3 | C2 | 2 |
| 0 | 0 | 1 | 3,4 | C1 | 3 |
| 0 | 1 | 1 | 4,5 | C2 | 4 |
| 0 | 1 | 0 | 5 | C1 | 5 |
| 1 | 0 | 1 | R | C1 | R |

FIG. 3.

CONTROL MEANS FOR ROTARY POWER TRANSMISSION

This invention relates to control means for rotary power transmissions of the dual clutch kind by which is meant a transmission having gear trains, each being one of a set providing a series of increasing speed ratios, and two clutches independently operable and providing alternative drive paths through the gear trains between a common input and a common output, the gear trains of alternate speed ratios in the set being driven respectively through one and the other clutch.

The invention is particularly, though not exclusively, applicable to gear transmissions for motor vehicles.

Fully automatic speed ratio selection for power transmissions requires signal means providing a signal indicative of the desired speed ratio in response to the usual control parameters of road speed throttle opening etc., and selector means responsive to that signal for controlling selection of the desired speed ratio.

The signal means may be mechanical but are more preferably electronic and act in response to control parameter signals from electronic transducers.

The selector means are usually hydraulically operable and utilise hydraulic fluid under pressure from a transmission driven pump. Electro-hydraulic solenoid valves responsive to the signal means may be provided to control selection of the desired speed ratio by directing hydraulic fluid under pressure to a selector servo. Such solenoid valves are expensive.

It is desirable for spatial and economic reasons to reduce the number of hydraulic components to the minimum commensurate with accurate functioning of the transmission.

A feature of transmission of the dual clutch kind is that two separate driving paths may be selected simultaneously with only one path transmitting driving torque through the transmission. It has been realised that this feature can be utilised to reduce the number of hydraulic components necessary for correct sequencing of the transmission.

According to the invention there is provided control means for a rotary power transmission of the dual clutch kind having a neutral speed ratio, reverse speed ratio and not more than five forward speed ratios, and comprising a fluid pressure source, three solenoid operated valves selectively energisable to direct fluid under pressure from said source to two single spool valves, the spools of said valves being responsive to provide discrete fluid pressure signals for controlling selection of the transmission speed ratios for eventual drive according to clutch engagement, the arrangement being such that the spool valves select forward speed ratios two at a time in progressively overlapping pairs.

The use of two spool valves responsive to three solenoid valves is a compact and economic method of achieving transmission control. Spool valves are inexpensive when compared with solenoid valves.

Preferably at least one of said solenoid operated valves is a pilot valve which controls only the position of the spool of a spool valve responsive to said solenoid-operated valve.

This arrangement results in a substantial reduction in solenoid valve size since the valve is not required to pass the relatively large amounts of hydraulic fluid necessary to operate the fluid pressure actuators for transmission speed ratio selection. The spool valves may conveniently be provided with large flow capacity ports to ensure a fast response of the actuators to changes in the state of each solenoid valve.

The control means may provide a discrete fluid pressure signal for controlling selection of the highest forward speed ratio only. Since much vehicle time is spent running in top ratio, thus provision avoids constant selection of the adjacent ratio with consequent noise and unnecessary wear.

Other features of the invention are included in the following description of a preferred embodiment shown, by way of example only, on the accompanying drawings in which:

FIG. 3 is a truth table showing the transmission state for each useful combination of energised solenoids.

Figure 1:
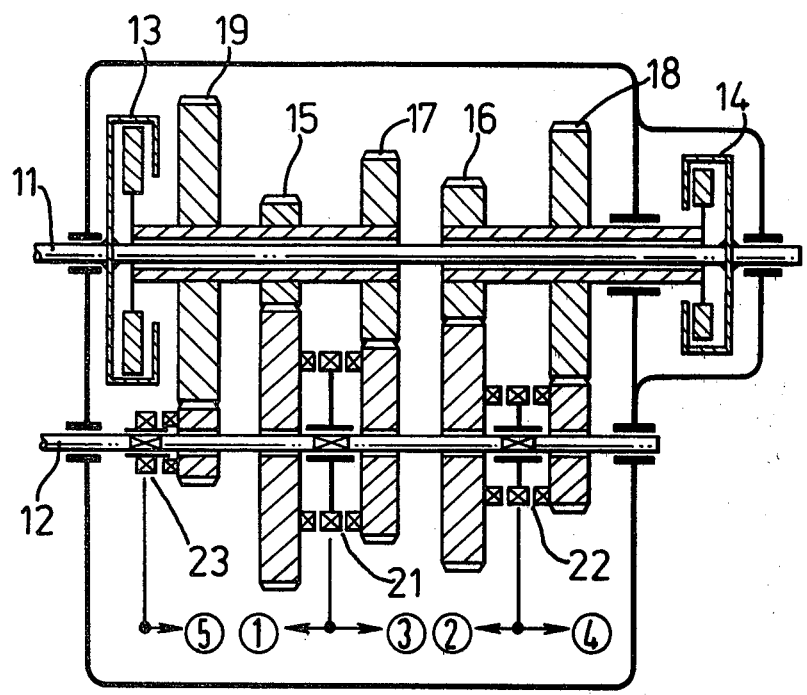
FIG. 1 is a sectional view through a two shaft transmission of the dual clutch kind.

With reference to FIG. 1 there is shown a transmission of the dual clutch kind having an input shaft 11 to drive an output shaft 12 through disengageable clutches 13 and 14. Five forward speed ratios are provided by gear trains 15-19 between the shafts; first, third and fifth speed ratios being driven through one clutch 13, second and fourth speed ratios being driven through the other clutch 14.

The output shaft 12 supports its gear wheels for relative rotation thereon. Synchroniser assemblies 21-23 are shiftable in response to selector means to connect the output shaft 12 to any one of the gear trains 15-19.

In operation, speed ratio changes in the transmission are made sequentially from one speed ratio to the next adjacent speed ratio by changing drive from one clutch to the other. Pre-selection of the next required ratio is a pre-requisite for this method of operation and thus is described in more detail with reference to FIGS. 2 and 3.

Figure 2:
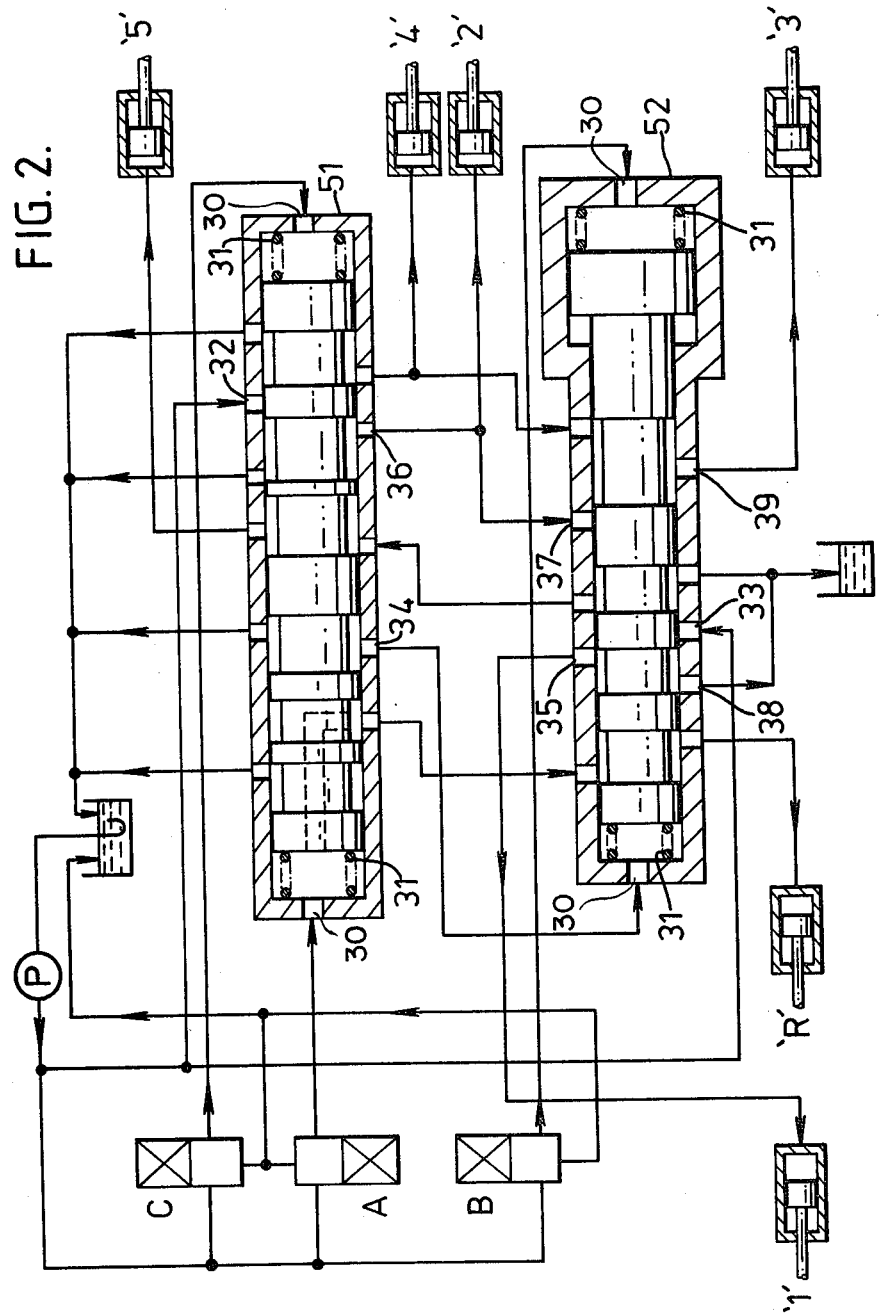
FIG. 2 is a hydraulic control circuit showing the control means of the invention.

In FIG. 2 three solenoid valves A, B and C are responsive to electrical control signals to pass hydraulic fluid under pressure from a pump P to control selection of the transmission speed ratios in accordance with the truth table of FIG. 3. The valves A, B and C are three-way with a drain outlet being connected to the main outlet when the solenoid is unenergised.

The solenoid control signals are generated in response to the usual automatic transmission control parameters of road speed, throttle opening etc. by any known method.

Two spool valves 51 and 52 are responsive to pressurised fluid passed by the solenoid valves to control selection of the transmission speed ratios by pressurisation of an actuator of each synchroniser assembly. For convenience, individual selector actuators are shown in FIG. 3 for each speed ratio; in practice a double-ended actuator would be preferable where one synchroniser assembly controls the selection of two speed ratios.

Each valve spool has three effective positions. It is biassed to the central position by return springs 31. It is movable in either direction by application of fluid pressure to one of the control ports 30 in the ends of the valve spool.

Operation of the control circuit is as follows:

In neutral, with vehicle engine running and the pump P delivering fluid under pressure to the solenoid valves A, B and C, the valves are not energised and their respective outlets to the spool valves 51 and 52 are open to drain.

Each of the selector actuators is connected to drain through the spool valves 51 and 52 except reverse which is open to drain through solenoid valve A. Each spool valve has a fluid pressure supply port, respectively 32 and 33.

When forward travel of the vehicle is required an electrical control signal energises solenoid A to shift the spool of valve 51 rightwards as viewed. The spool of valve 52 also moves rightwards in consequence of fluid supply from outlet port 34 of valve 51. First speed ratio is selected by connection of inlet port 33 and feed port 35 of valve 52, second ratio is also selected by connection of inlet port 32 with feed port 36 of valve 51. The inlet port 37 of valve 52 is pressurised but closed by a land of the spool.

Clutch C1 of the transmission is engaged to couple the vehicle engine to the vehicle driving wheels and, at an appropriate moment determined by the electronic control, a ratio change to second speed is made by simultaneously disengaging clutch C1 and engaging clutch C2.

First speed ratio gear train 15 is now driven idly by the transmission output shaft.

If an upchange is indicated by the electronic control, solenoid B is energised to shift the spool of valve 52 leftwards, as viewed, by virtue of the larger end area exposed to fluid pressure. First ratio actuator drains through port 38 and third ratio actuator shifts to preselect the gear train 17 through connection of hitherto pressurised inlet port 37 with feed port 39. Thus, third speed is pre-selected in readiness for an upchange by changing drive from clutch C2 to clutch C1.

In the same way, if an upchange to fourth ratio is indicated by the electronic control, fourth ratio gear train 18 will be pre-selected in accordance with the truth table of FIG. 3.

On selection and engagement of fifth speed ratio, fourth speed ratio is disengageable to avoid idling of the fourth ratio gear train during the long periods when fifth ratio may be engaged. This avoids unnecessary wear of the fourth gear train.

Transmission downchanges are performed in the same way as the upchanges by pre-selection of the next required speed ratio.

It is a particular advantage of the hydraulic control circuit that the solenoid valves A, B, and C only control the position of the spool valves and that fluid under pressure is supplied to the actuators through separate spool valve inlet ports. This arrangement makes large fluid flow rates possible and ensures a fast response of the actuators to changes in the position of the valve spools. The solenoid valves may be small and of economical construction since they act only as pilot valves.

Reverse speed ratio actuator is supplied with fluid pressure directly from solenoid A. This is not detrimental to transmission performance since a fast response rate for reverse ratio actuator is not required.

It is important that failure of any one of the solenoid valves A, B and C does not result in the transmission selecting a ratio which would damage the vehicle or be potentially dangerous to the occupants. The hydraulic control circuit is designed such that failure of one solenoid in any gear will result in the transmission changing to the next adjacent ratio, up or down, or going into neutral.

I claim:

1. Control means for a rotary transmission having an input and an output and at least first, second and third gear trains in a series, selection means for individually selecting each gear train, a first clutch arranged to selectively connect the input with the output through an odd numbered gear train in the series selected by its selection means, a second clutch arranged to selectively connect the input with the output through an even numbered gear train in the series selected by its selection means, the control system comprising:

a fluid pressure source, at least three fluid pressure operable actuation means, one for operating each of said selection means, two single-spool valves having inlets connected from said pressure source and outlets connected to said actuation means and having control ports, three solenoid operated valves arranged to supply fluid from said source selectively to said control ports to control the spool valves and thereby control distribution of pressure to said actuation means for operation of said selection means for selection of gear trains two at a time in overlapping pairs.

2. Control means according to claim 1, wherein one of the solenoid operated valves is a pilot valve to control only the position of the spool of one of the spool valves.

3. Control means according to claim 2, wherein all three solenoid operated valves are pilot valves.

4. Control means according to claim 3 wherein said spool valves in one position are arranged to supply fluid pressure to the actuation means of the highest ratio gear train only.

5. Control means according to claim 1, wherein a reverse speed gear train is selectable by reverse speed actuation means responsive to fluid pressure directed from one of said solenoid valves.

6. Control means according to claim 5, wherein fluid pressure is directed from said solenoid valve through one of said spool valves to said reverse speed actuation means.

* * * * *

UNITED STATES PATENT AND TRADEMARK OFFICE
CERTIFICATE OF CORRECTION

PATENT NO. : 4,442,727

DATED : April 17, 1984

INVENTOR(S) : Alastair J. Young

It is certified that error appears in the above-identified patent and that said Letters Patent is hereby corrected as shown below:

On the title page assignee should read

-- (73) Assignee: Automotive Products Limited
                  Leamington Spa, England --.

Signed and Sealed this

Fourteenth Day of October, 1986

[SEAL]

*Attest:*

DONALD J. QUIGG

*Attesting Officer*   *Commissioner of Patents and Trademarks*